United States Patent Office 3,403,573
Patented Oct. 1, 1968

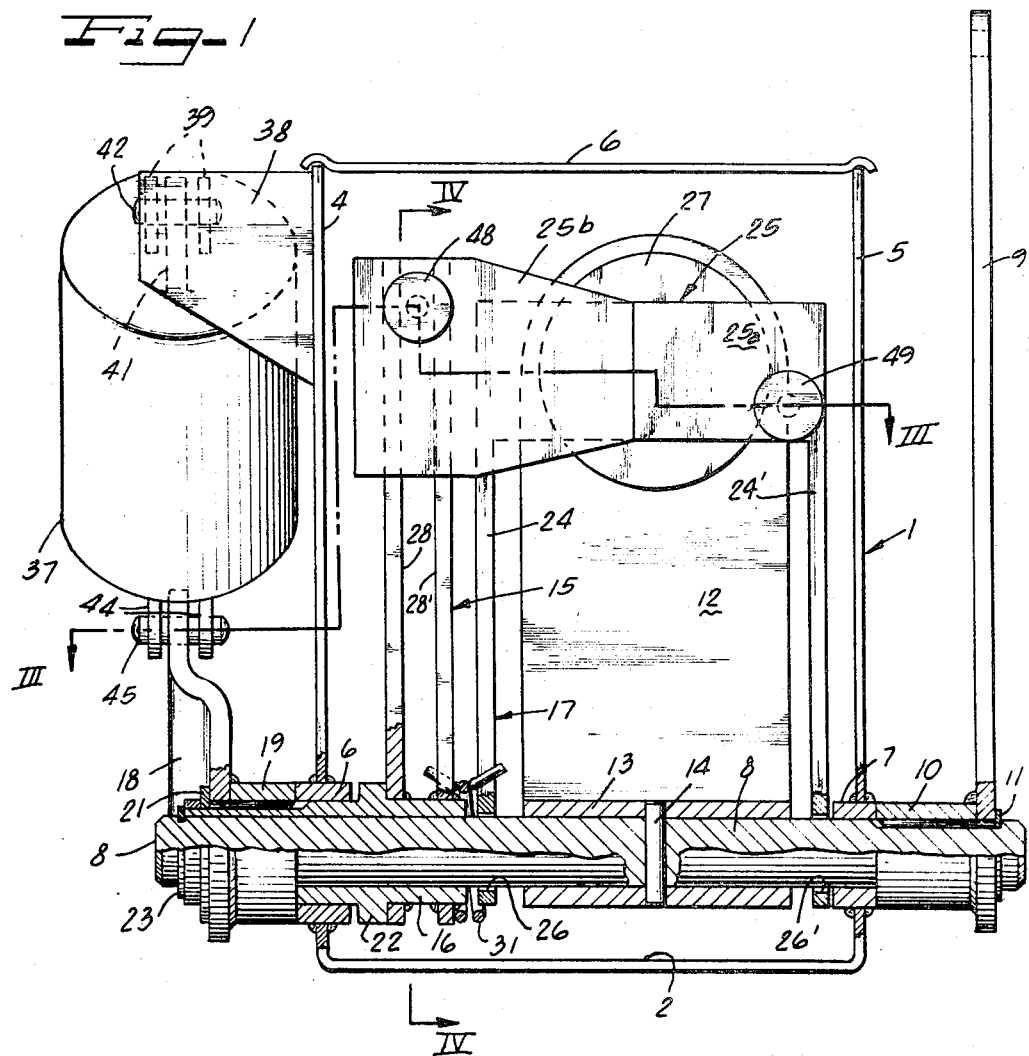

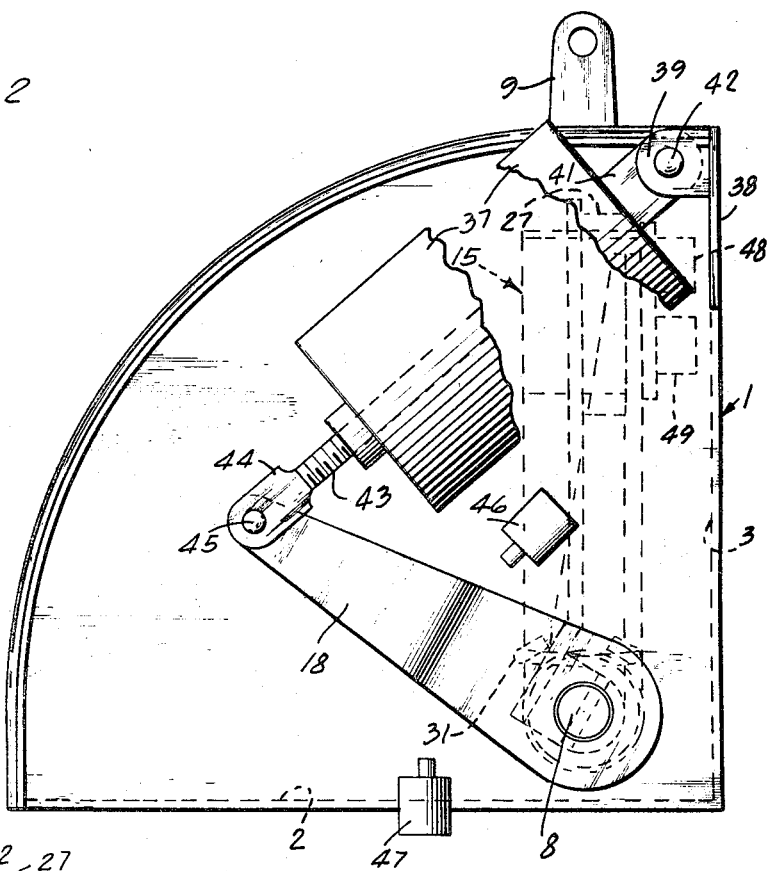
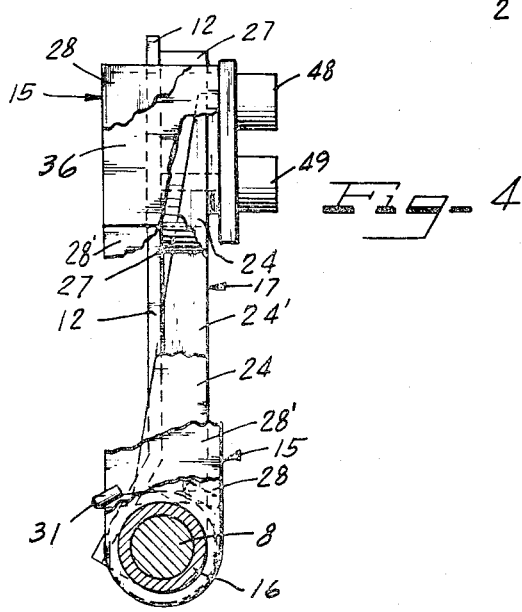

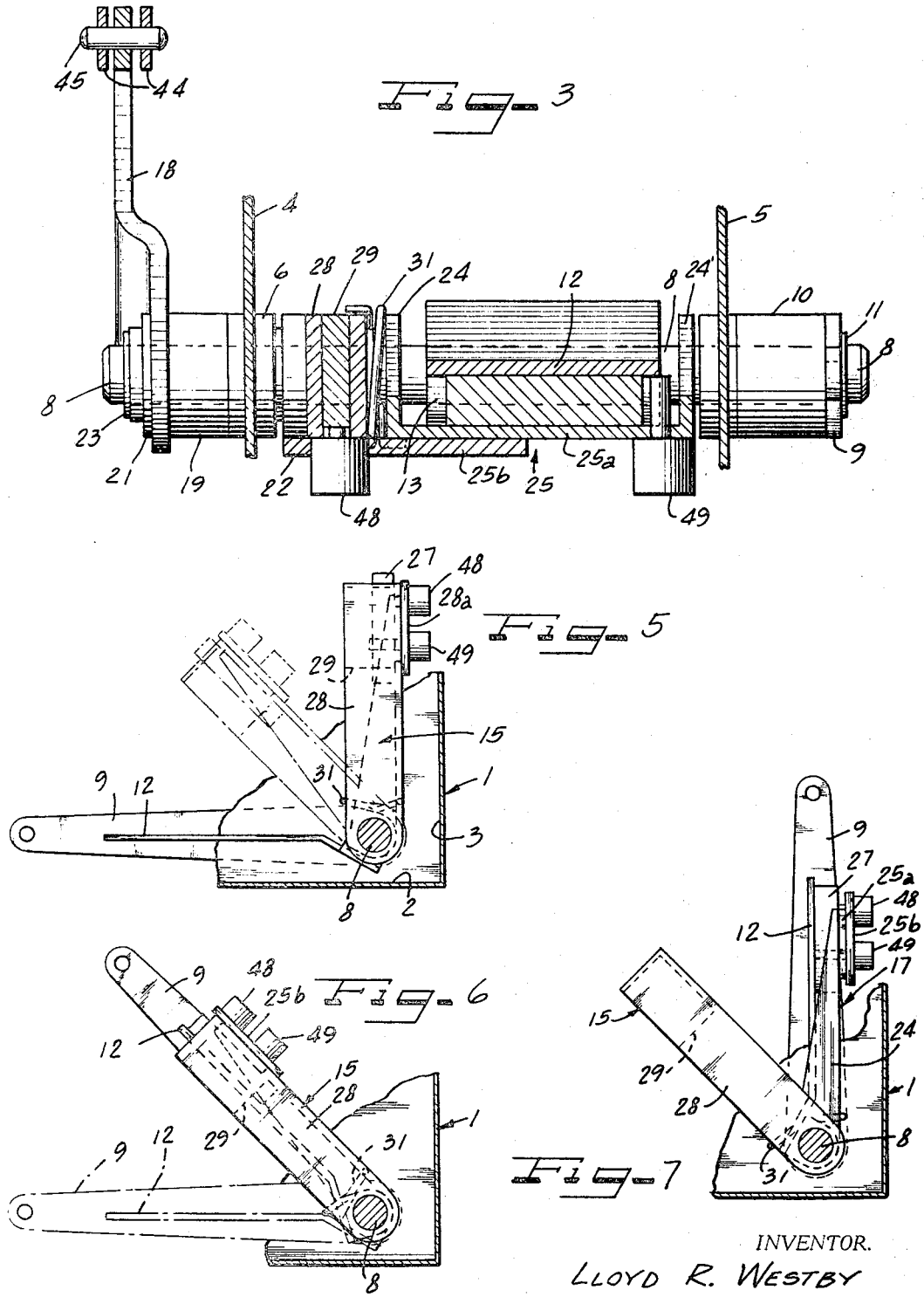

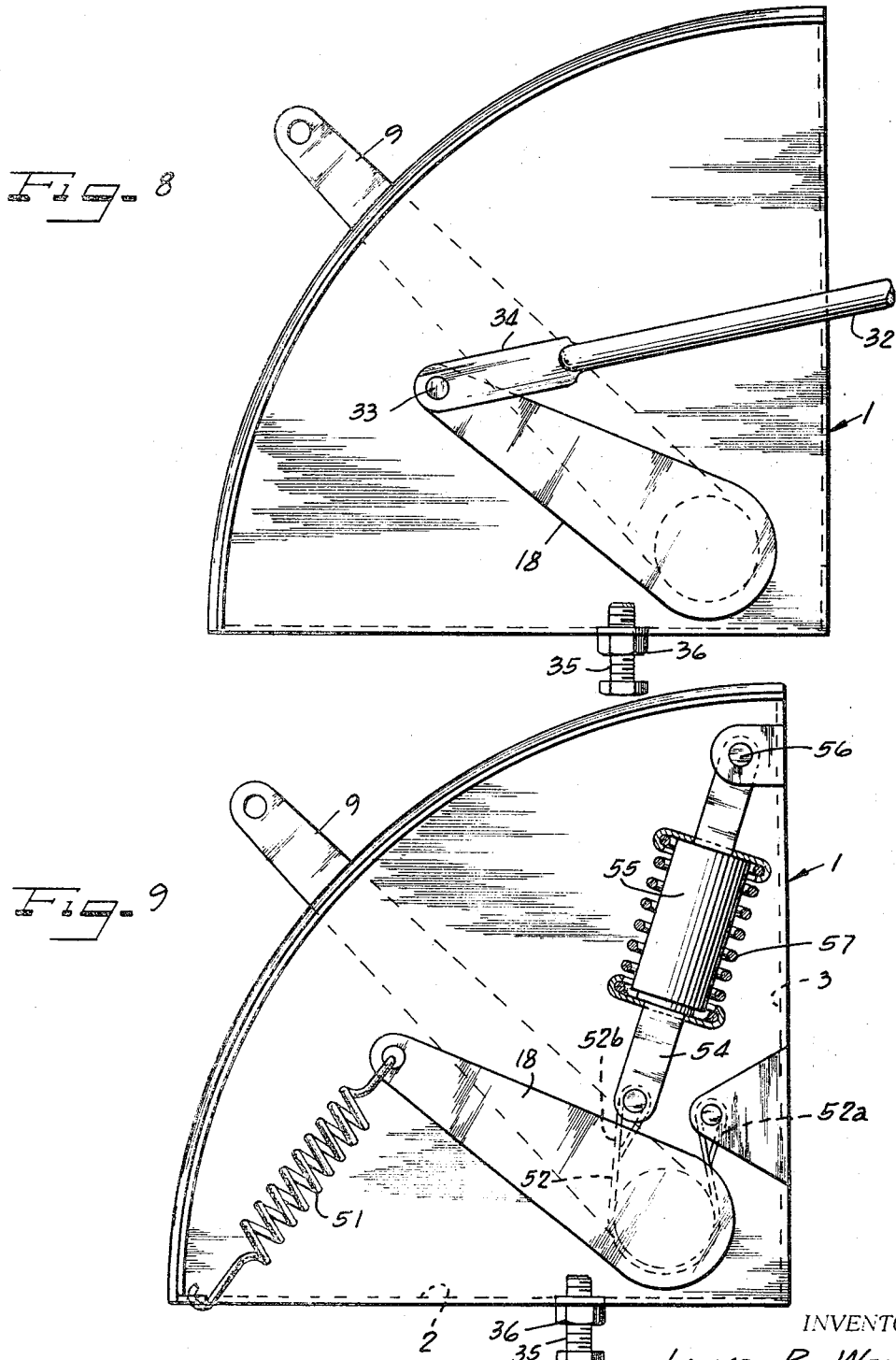

3,403,573
CONTROL DEVICE
Lloyd R. Westby, P.O. Box 233, Wayne, Ill. 60184,
and Francis H. Bourgeois, P.O. Box 84, Oak Park,
Ill. 60305
Filed Sept. 30, 1966, Ser. No. 583,192
15 Claims. (Cl. 74—469)

ABSTRACT OF THE DISCLOSURE

A control device having a plurality of cooperable arms, movable relative to one another, one of such arms being constructed for connection with an operating element of the apparatus to be controlled by said device, a second of said arms being constructed for connection to means, such as an electric motor or a manually controlled member, for determining the position of the second arm as a control function, a third of said arms being releasably connected to the first arm and to the second arm, whereby the latter arm may control the position of the first arm through the connection of the third arm to the first and second arms, the first arm being releasable from the third arm to permit free movement of the first arm relative to the third arm, thereby rendering the controlling action of the second arm on the first arm inoperative, and the third arm being releasable from the second arm in response to an overriding force applied to the third arm by the first arm, in which the releasable connection between the first and third arms may comprise an electromagnet, and that between the second and third arm may comprise a permanent magnet.

The disclosure

The invention relates to a control mechanism for effecting an adjustable mechanical control of apparatus, responsive to controlling forces which may be of mechanical or electrical nature.

The invention has particular application in control devices such as speed control apparatus for motor vehicles or other equipment which may be subject to variation. The invention, however, will be described, for the purposes of explanation, in connection with its use as a vehicle speed control.

The invention has among its objects the production of a control mechanism which, for purposes of illustration, may be utilized in connection with a controllable element such as the accelerator linkage of a motor vehicle, whereby such linkage may be preset to desired adjustment settings, at the same time providing means for rendering the controlling effect inoperative, when desired, as for example in a motor vehicle when the latter is to be brought to a stop and the speed setting rendered inoperative, or a speed greater than the setting is desired.

Another object of the invention is the production of such a device which is extremely flexible in its application, being compact in size and capable of being mounted in substantially any desired position and enabling its operation to be effected through electrical control means, as for example a solenoid or motor, as well as mechanically, and in particular is capable of readily being adapted for remote control operation with wire or radio transmission.

A further object of the invention is the production of such a device which may be readily constructed to provide a compensating action whereby the controlled device will be maintained at the preset adjustment, automatically compensating for variations in operation resulting from the effect of external conditions to which the controlled device may be subjected.

A further object of the invention is the production of such a device which while extremely efficient in operation and of substantially universal application, is exceedingly simple in construction, substantially foolproof in operation and inexpensive to manufacture, enabling its use in a wide variety of applications.

Many other objects and advantages of the construction herein shown and described will be obvious to those skilled in the art from the disclosure herein given.

In the drawings wherein like characters indicate like or corresponding parts,

FIG. 1 is an end view of a control device embodying the present invention, with the end wall of the housing removed and portions of the structure broken away to show the details thereof;

FIG. 2 is a side elevational view of the construction illustrated in FIG. 1;

FIG. 3 is a sectional view taken approximately on the line III—III of FIG. 1;

FIG. 4 is a sectional view through the control mechanism taken approximately on the line IV—IV of FIG. 1 with portions of the various members broken away;

FIG. 5 is a semi-diagrammatic side elevational view of the control mechanism illustrating relative positions of the parts when the device is not in operation;

FIG. 6 is a figure similar to FIG. 5 illustrating the relative positions of the parts when the device is in normal operation;

FIG. 7 also is a figure similar to FIG. 5 illustrating the relative positions of the parts when the control device is overridden by means acting thereupon;

FIG. 8 is a side elevational view similar to FIG. 2 illustrating an arrangement for effecting mechanical adjustment of the control mechanism; and FIG. 9 is a figure similar to FIG. 8 illustrating an arrangement for effecting a mechanical-electrical adjustment of the control mechanism.

As previously mentioned, the invention has particular importance in connection with the control of vehicle speeds, wherein the control mechanism may be adjusted to provide a predetermined vehicle speed, which if desired may be automatically compensated to take into consideration uphill and downhill travel of the vehicle, as well as other speed varying forces acting thereon, and at the same time permit complete and positive release of the mechanism when it is desired to apply the brakes of the vehicle, and further enabling a positive override of the speed setting when it is desired to accelerate the vehicle above the preset speed. In the compensated embodiment, the compensation may be readily effected by means of an electric motor, enabling remote control operation with wire or radio transmission, etc.

The present invention broadly contemplates the use of a control mechanism, in which a plurality of cooperable arms movable with respect to one another are employed, one arm being adapted to be connected to the controlled mechanism, and another being adapted to be connected to means for effecting the degree of control to be exerted. A third arm forms an operative connection between the first mentioned arm and magnetic means provided for maintaining desired connections between said second arm and the first and third arm, with such magnetic connections being so arranged that under selected conditions the control as determined by the third arm may be overridden, and when desired the control operation may be rendered inoperative. By utilizing power means to control the position of the second arm compensation and remote control functions may be readily performed. However, the control of the second arm may be readily accomplished by mechanical, electromechanical, electrical or manually actuated means.

Referring to the drawings and more particularly to FIGS. 1 through 4, reference numeral 1 indicates generally a housing structure having a bottom 2, front wall 3, side walls 4 and 5 having arcuate edges, and closed by an arcuate shaped cover member 6. The side walls 4 and 5 may be provided with respective bearing sleeves 6 and 7, which are rigidly secured by brazing, welding, or other suitable means to the corresponding side wall. Journaled in bearings 6 and 7 is an operating shaft 8 to which is rigidly connected an operating arm 9 which forms the controlled member of the device and is adapted to be operatively connected to the control member of the mechanism to be controlled. The arm 9, in the embodiment illustrated, is rigidly secured by suitable means such as welding or brazing to a collar 10 having a bore of a size to receive the adjacent end of the shaft 8 and suitably keyed to the shaft, with the arm being retained on the shaft by a snap ring 11 seated in a peripheral groove in the shaft 8. Also rigidly connected to the shaft 8 is a first control arm designated generally by the numeral 12, which is in the form of a plate-like member the lower end of which terminates in a hub portion 13 through which the shaft 8 extends with the arm being rigidly secured to the shaft by the transversely extending pin 14.

Also carried by the shaft 8 is a second control arm, designated generally by the numeral 15, the latter being rigidly carried on a sleeve 16 adjacent one end thereof with the opposite end of the sleeve extending through the bearing sleeve 6 to the exterior of the housing.

Also supported on the shaft 8 and freely rotatable thereon is a third control arm, designated generally by the numeral 17, of generally U-shaped configuration. Carried by the outer end of the sleeve 16 is an actuating arm 18 which is rigidly secured to a collar 19 disposed on the sleeve 16 and suitably keyed thereto, retention of the collar 19 being effected by a snap ring 21 disposed in a peripheral groove in the adjacent end of the sleeve. Outward movement of the sleeve 16 with respect to the bearing 6 is prevented by the flange 22 formed on the intermediate portions of the sleeve. In like manner inward movement of the adjacent end of the shaft 8 is prevented by the snap ring 23 seated in a peripheral groove in the shaft 8 and bearing on the adjacent end of the sleeve 16.

The third control arm 17, as previously mentioned, is of generally U-shaped formation having a pair of parallel leg portions 24–24' connected at their upper ends, as viewed in FIG. 1, by a cross-member indicated generally by the numeral 25, constructed in the particular embodiment of the invention illustrated in two pieces, one 25a being of generally rectangular shape which bridges the respective legs 24, and the other an enlarged extension 25b which extends laterally to the left of the portion 25a and is disposed adjacent the free end of the second arm 15. The free ends of the legs 24–24' are provided with aligned bores 26 through which the shaft 8 extends. Carried by the portion 25a of the arm 17 is an electromagnet, indicated generally by the numeral 27, which is disposed for coaction with the first arm 12, the latter forming the armature for the magnet.

The second arm 15, in the embodiment illustrated, comprises two parallel leg portions 28–28' secured in spaced relation at their lower ends to the sleeve 16 and connected at their upper ends by a permanent magnet 29 which is disposed in opposition to and cooperable with the portion 25b of the third arm 17. The portion 25b thus forms an armature for cooperation with the permanent magnet 29. The arms 15 and 17 are normally maintained in the positions illustrated in FIGS. 1 and 4, with the armature 25b adjacent the magnet 29, by a torsion spring 31 which encircles the shaft 8 and has one free end bearing on the adjacent leg 28' of the arm 15 and the other free end bearing on the adjacent leg 24 of the arm 17.

The operation of the structure thus described will be explained in connection with FIGS. 5, 6 and 7, which illustrate the respective parts in different positions in accordance with the particular function involved. It will be apparent that the following individual operations can take place:

First, the third arm 17 is normally disposed, responsive to the action of the spring 31, adjacent the arm 15 with the permanent magnet 29 exerting an attractive force on the armature 25b, the magnetic force thus exerted tending to maintain the arms in engaged relation. Likewise, in the event electromagnet 27 is energized, it will be operative to normally retain the arm 12 in engagement therewith as illustrated in FIG. 4, whereby the respective arms will be normally interlocked with one another, with the controlled arm 9 following the movements of the actuating arm 18. However, if it is desired to render the control by the arm 18 inoperative, the electromagnet 27 is merely deenergized thereby releasing the arm 12 therefrom. In most applications of the device, the controlled arm 9 will normally be spring-biased in a direction away from the magnet 27 and thus upon deenergization of the magnet would assume the position illustrated in FIG. 5. It will also be appreciated that as the arm 17 is retained in engagement with the arm 15, merely through the action of the spring 31 and magnetic attraction exerted by the magnet 29, in the event sufficient force is exerted on the arm 17, as for example by corresponding movement of the arm 9, as soon as the applied force to the arm 17 exceeds the spring force and the magnetic attraction exerted by the permanent magnet 29, the arm 17 and with it the arm 9 may be moved in a direction away from the arm 15 to produce an overriding action with respect to the control effected through the arm 15.

Referring to FIG. 5, the controlled arm 9 is illustrated in its extreme counterclockwise position with respect to the axis of the shaft 8, and the arms 15 and 17 are illustrated as being in their extreme clockwise positions. It will be apparent that with the arms 15 and 17 in this position and the electromagnet 27 deenergized, the arm 9 is free for movement, without restriction, throughout an arc of approximately 90° and the controlled element connected to the arm 9 may thus be freely operated without regard to the control mechanism, the latter having no effect whatever thereon.

In the event it is desired to initiate a control operation, the arms 15 and 17 may be moved to any desired position, by means of actuation of the arm 18, for example, to the position illustrated in dotted lines in FIG. 5 or solid lines in FIG. 6, and the electromagnet 27 suitably energized. Upon movement of the arm 12 into engagement with the electromagnet 27, the arm 12 will be retained in operative engagement with the arm 17, enabling the arm 9 to thereafter follow the movement of the arm 18.

In the event it is desired to override the action of the control mechanism, i.e., to rotate the arm 9 clockwise without regard to the position of the arm 15, this may be accomplished by the application of sufficient force to the arm 9 in a clockwise direction as viewed in FIG. 6 until sufficient force is applied to overcome the action of the spring 31 and attraction of the magnet 29, at which time the arm 17 will be separated from the arm 15 and may be moved clockwise, for example, to the position illustrated in FIG. 7. Upon cessation of the overriding force, the arms 9, 15 and 17, may be returned to their original position illustrated in FIG. 6, at which time control will be returned to the arm 18. It will be apparent that the particular operations described are particularly suitable for application in vehicle speed control systems, for example, where it is desired to provide an arrangement by means of which the accelerator of the vehicle may be automatically retained at any desired speed setting, but at the same time permitting an override of such speed setting when additional acceleration is desired, and in assuring that upon application of the brake pedal to slow down or stop the vehicle, the accelerator will be instantly released. It will also be apparent that in such type of installation it is particularly desirable that as little drag be imposed upon the accelerator linkage by the control mechanism, particularly when the control device is inoperative or is released during the braking operation.

Thus in utilization of the device for this purpose, the structure would be suitably positioned on the vehicle whereby the accelerator linkage could be operatively connected to the controlled arm 9, so that the latter will move with the accelerating linkage, it being assumed for the purposes of illustration that when so connected the arm 9 will be in the position illustrated in FIG. 5 when the accelerator is not depressed and that the position of the arm 9 in FIG. 7 represents the full throttle position of the accelerator linkage. In this arrangement the electromagnet 27 would be suitably connected in a circuit including a switch responsive to brake pedal movements, whereby such switch will be opened in response to pedal movement thereby disconnecting the arm 13 from the arm 17 and permitting the accelerator linkage to return to its low speed position responsive to the action of the springs normally incorporated in such linkage. Adjustment of the arm 18 and thereby the arm 15 for any particular accelerator setting may be accomplished by any suitable means, as hereinafter described, whereby the position of the arm 15 represents the desired control setting.

The operation of the device in this application of the invention is as follows: Assuming that the positions of the parts are as illustrated in solid lines in FIG. 5, the vehicle accelerator will be at minimum speed position and it may be readily moved through its normal travel represented by approximately 90° travel of the arm 9 from the position illustrated in FIG. 5 to that illustrated in FIG. 7, without interference. The vehicle accelerator thus is operable in the usual manner to the same extent that it would be if the control device were absent, with the only additional elements movable responsive to accelerator travel being the arms 9 and 13, and as the latter, in such case, are freely movable, the only additional drag on the accelerator linkage is that occasioned by friction appearing between the shaft 8 and its supporting bearing elements such as bearing sleeve 7 and the sleeve 16, which would be relatively minor and thus exert a negligible drag on the accelerator linkage, compared with the force exerted by the return spring thereof.

To utilize the control, the arm 15 is merely brought to the desired position, for example, the position illustrated in FIG. 6, by action of the arm 18, the latter for purposes of illustration being assumed to be manually adjustable, which adjustment of the arm 15 will automatically carry the arm 17 therewith. At the same time, by means of a suitable control switch or the like, the electromagnet 27 is energized so that when the arm 12 reaches a point of engagement with the electromagnet 27 on the arm 17, the magnetic attraction of the electromagnet will prevent return of the accelerator to its minimum position upon release of manual pressure on the accelerator and the engine will continue to run at the speed determined by the position of the arm 15. If occasion arises, requiring additional acceleration of the vehicle, the driver merely applies additional pressure to the accelerator which is transmitted to the arm 9 and thereby to the arm 12, which then transmits such additional pressure to the arm 17, tending to rotate it clockwise in a separating direction with respect to the arm 15, and upon the application of sufficient pressure to the arm 17 to overcome the action of the spring 31 and attraction of the permanent magnet 29, the arm 17 will break away from the arm 15, permitting the arm 9 to move in a clockwise direction beyond the initially set position to advance the accelerator to a higher speed position. When such need for acceleration has passed and the overriding pressure is released on the accelerator, the arm 9, and with it the arms 12 and 17 will move in a counterclockwise direction until the arm 17 engages the arm 15, at which point further movement of the arm 9 will cease and the accelerator linkage has been returned to its original adjusted position.

In the event it becomes necessary to reduce the speed of the vehicle or to stop the same, on application of pressure to the brake pedal, the switch associated therewith will be actuated to open the circuit to the electromagnet 27, thus permitting the latter to be deenergized whereby the accelerator return spring will return the accelerator linkage, including the arms 9 and 12, to the slow speed position illustrated in FIG. 5. Upon release of the brake pedal, the electromagnet 27 will again be energized, and upon depression of the accelerator linkage and thus clockwise movement of the arms 9 and 12 to the initial speed setting, the electromagnet 27 will again retain the arm 13 in adjusted position as illustrated in FIG. 6 and the control will then resume its control function.

The position of the arm 18 may be readily controlled manually, electrically or electromechanically, FIGS. 1, 2, 8 and 9 illustrating examples of construction for effecting such types of control. FIGS. 1 and 2 illustrate the use of an electrical control by means of an electric motor while FIG. 8 illustrates a manually operable mechanical control, and FIG. 9 an electromechanical arrangement employing a solenoid-controlled mechanical adjusting structure.

Referring to FIG. 8, the position of the control arm 18 is determined by manual adjustment of a control rod 32, pivotally connected to the arm 18 by a pin 33 passing through the clevis 34 on the adjacent end of the rod, whereby the arm 18 may be pivoted about the axis of the shaft 8 in response to a push or pull movement of the rod 32. Counterclockwise movement of the arm 18 may be limited by suitable means such as a limit screw 35 and cooperable lock nut 36.

In the embodiment of FIGS. 1 and 2, an electric motor 37 is pivotally mounted at its upper end to the side wall 4 by means of a suitable bracket 38 provided with parallel members 39 between which is disposed an arm 41 carried by the motor 37, the arm being pivotally secured to the members 39 by a pin 42. The motor 37 is provided, for example, with a hollow, internally threaded shaft in which is cooperably disposed a threaded rod 43 which may be extended from or retracted into the motor shaft by rotation of the latter in appropriate direction. The free end of the rod 43 is provided with a clevis 44 pivotally connected to the arm 18 by a pin 45, the axis of which extends parallel to the axis of the pin 42, with the pin 45 also preventing rotation of the rod 43.

Thus, by actuation of the motor 37 the effective length of the linkage, comprising the motor and the rod 43, may be varied to pivotally adjust the arm 18, the screw connection between the rod and the motor shaft also functioning to retain such linkage in any of the adjusted positions. Extreme positions of the arm 18 may be readily controlled by suitable limit switches 46, 47 arranged for actuation by the arm 18, and operatively disposed in the electrical motor circuit to open the latter and stop the motor when the arm 18 reaches either of its extreme positions.

Likewise, suitable switches 48 and 49 may be provided, for example on the arm 17, the switch 48 being disposed for actuation by the arm 15, and the switch 49 being disposed for actuation by the arm 12. Such switches may be suitably arranged in the electrical control circuit to render the latter inoperative when the controlled device is to be actuated independently of the control circuit, i.e., when the respective arms involved are separated from one another. For example, assuming the motor 37 is connected in an automatic control circuit operative to actuate the motor and adjust the arm 18 in response to operational changes in the control circuit, it might otherwise be possible, depending upon the circuit involved, to actuate the motor 37 when an overriding action is effected or when the electromagnet 27 is deenergized to permit the controlled arm 9 to return to a minimum position as illustrated in FIG. 5, whereby the motor would endeavor to compensate for such movement of the controlled arm 9. Under such circumstances, the switches 48 and 49 may be suitably disposed in the electrical control circuit, or the motor circuit to prevent a compensating operation thereof. Thus the switch 49 could be a normally open switch adapted to open when disengaged from the arm 15 whereby the control mechanism is rendered inoperative when the arm 15 is disengaged from the arm 17. Likewise, the switch 49 could perform a similar function when the arm 12 is disengaged from the electromagnet 27 of the arm 17. Obviously, utilization of switches 48 and 49 would depend upon the control circuits involved.

In the construction of FIG. 9 the arm 18 is biased in a counterclockwise direction by a suitable tension spring 51, with the extreme counterclockwise position being determined by the limit screw 35. The arm 18 may be locked in any of its intermediate positons by a clutch or brake band 52 having one end 52a anchored to the housing 1 and the other end secured to the plunger 54 of a solenoid 55, the body of which is suitably pivotally connected by a pin 56 to a bracket carried by the housing 1. The band 52 is frictionally engageable with the hub 19 of the arm 18 and is manually biased by a tension spring 57 to normally effect a rigid locking of the arm 18. However, by energization of the winding of the solenoid 55, the plunger 54 will be moved outwardly therefrom, against the action of the spring 57, releasing the arm 18 which may then be suitably adjusted, for example, in a clockwise direction by pressure applied to the controlled linkage associated with the arm 9, and upon achieving the desired position of the arm 9, the solenoid is deenergized to permit return of the band 52 to its locking position. In the event it is desired to adjust the arm 18 in a counterclockwise direction, following energization of the solenoid winding, the arm 18 is permitted to move under the action of the spring 51, with the controlled linkage being correspondingly moved therewith.

In the utilization of the device as a speed control for a motor vehicle, with the controlled arm 9 being operatively connected to the vehicle accelerator, the adjustment of the last-mentioned arrangement would be effected by energization of the solenoid, following which the arm 18 would be adjusted by appropriate movement of the vehicle accelerator, with the solenoid thereafter being deenergized to lock the structure in its adjusted position.

Likewise, in utilization of the device of FIGS. 1 and 2 as a vehicle speed control, the switch 48 would function to render the control circuit inoperative when the accelerator is manually depressed beyond the control setting to effect an override thereof, while the switch 49 would be actuated when the electromagnet 27 is deenergized, for example, responsive to application of the vehicle brakes, permitting the arm 12 to return to its low-speed position, with the switch 49 being operative to prevent operation of the control circuits until the accelerator has been returned to the adjusted speed setting.

It will be apparent from the above disclosure that we have provided a control mechanism which, while exceedingly simple in construction, is very efficient for the intended purposes, accommodating a wide variety of installational arrangements and control operations. Likewise, while we have described the utilization of the invention as a vehicle speed control device, obviously the invention has wide application wherever a control function is to be provided, either automatically or selectively adjustable, and is adapted to be overridden or otherwise rendered inoperative under predetermined operating conditions.

It will also be apparent, as heretofore mentioned, that the construction of the device is such that an extreme minimum of additional elements are permanently connected with the controlled mechanism so that a minimal additional drag is imposed upon the controlled mechanism. Thus, only the arm 9, shaft 8 and arm 12 remain in connected relation with the controlled linkage associated with the arm 9 when the device is not in use, overrode, or in the event the solenoid 27 is deenergized.

While the example of the invention illustrated and described has an operative travel of substantially 90°, it is believed apparent that the invention may be readily embodied in constructions with greater or lesser travel, depending upon the particular application involved. This may be accomplished in suitable application by merely arranging the housing to accommodate movement of the respective arms over a longer path, or in cases where this is not feasible, as for example, where the adjusting member of the device to be controlled has a travel of over one complete revolution, the adjusting member may be connected to the operating shaft 8 by suitable reduction gearing whereby the full operating movement of the shaft 8 is proportional to the full travel of the adjusting member.

Likewise, while the illustrative application of the invention utilizes a specific arrangement of permanent and electro-magnets, depending upon the particular application, either or both of the magnetic elements may be permanent magnets or electro-magnets, in accordance with the control operation desired.

It will also be apparent that the structure is very compact and is capable of being disposed in a minimum space as may be dictated by the mechanism with which it is to be employed.

It will be understood that modifications and variations may be effected without departing from the scope of the novel concepts of the present invention.

What we claim as new and desire to secure by Letters Patent is:

1. In a control device, the combination of a plurality of cooperable arms, movable relative to one another, one of said arms being constructed for connection with an operating element of the apparatus to be controlled by said device, a second of said arms being constructed for connection to means for determining the position of said second arm as a control function, means releasably securing a third of said arms with the first arm, means releasably securing said third arm to said second arm, whereby the latter arm may control the position of said first arm through the connection of said third arm to said first and second arms, said first mentioned releasable means being releasable to permit free movement of said first arm relative to said third arm, thereby rendering the controlling action of said second arm on said first arm inoperative, and said second mentioned releasable means being releasable in response to an overriding force applied to said third arm by said first arm.

2. A control device according to claim 1, wherein said first mentioned releasable means comprises a magnetic element operative to secure said first arm to said third arm by magnetic attraction.

3. A control device according to claim 2, wherein said magnetic means comprises an electro-magnet.

4. A control device according to claim 1, wherein said second mentioned releasable means comprises a magnetic element operative to secure said second arm to said third arm by magnetic attraction.

5. A control device according to claim 4, wherein said second mentioned releasable means comprises a permanent magnet.

6. A control device according to claim 1, comprising resilient means operatively connecting said second and third arms operative to urge said arms toward one another.

7. A control device according to claim 1, comprising means operatively disposed between said first and third arms for providing a control criterion responsive to a predetermined relation between such arms.

8. A control device according to claim 7, wherein said control criterion providing means comprises a switch, provided on said third arm, which is in one operating condition when the associated arms are in operative engagement, and in another operating condition when such arms are disengaged.

9. A control device according to claim 1, comprising means operatively disposed between said second and third arms for providing a control criterion responsive to a predetermined relation between such arms.

10. A control device according to claim 9, wherein said control criterion providing means comprises a switch, provided on said third arm, which is in one operating condition when the associated arms are in operative engagement, and in another operating condition when such arms are disengaged.

11. A control device according to claim 1, wherein said first, second and third arms are pivotally supported on a common axis, said first and third arms being operatively disposed at the same side of said second arm and movable in the same direction away from said second arm, said third arm being movable in the same direction away form said first arm, said first releasable means comprising an electro-magnet carried by said third arm and cooperable with said first arm, said second releasable means comprising a permanent magnet carried by said second arm and cooperable with said third arm.

12. A control device according to claim 11, wherein said means for determining the position of said second arm comprises an electric motor operatively connected to such arm.

13. A control device according to claim 11, wherein said means for determining the position of said second arm comprises a manually actuatable member operatively connected to such arm.

14. A control device according to claim 11, wherein said means for determining the position of said second arm comprises releasable means for locking said second arm in any of its adjusted position, electrically actuatable means for selectively releasing said locking means, and resilient means operatively connected to said second arm for biasing the latter in an extreme position of its travel.

15. A control device according to claim 14, wherein said electrically actuatable means comprises a solenoid having a plunger operatively connected to said locking means.

References Cited

UNITED STATES PATENTS 2,280,246   4/1942   McCullough _____ 74—469

FRED C. MATTERN, Jr., *Primary Examiner.*

B. T. CALLAHAN, *Assistant Examiner.*